United States Patent
Lee et al.

(10) Patent No.: US 12,246,439 B2
(45) Date of Patent: Mar. 11, 2025

(54) ROBOTIC JOINT HAVING A SPHERICAL LINKAGE

(71) Applicant: Sanctuary Cognitive Systems Corporation, Vancouver (CA)

(72) Inventors: Joshua Lee, Burnaby (CA); Connor Richard Shannon, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/197,915

(22) Filed: May 16, 2023

(65) Prior Publication Data

US 2023/0364808 A1    Nov. 16, 2023

Related U.S. Application Data

(60) Provisional application No. 63/342,414, filed on May 16, 2022.

(51) Int. Cl.
| | | |
|---|---|---|
| *B25J 15/08* | (2006.01) | |
| *B25J 9/10* | (2006.01) | |
| *B25J 9/14* | (2006.01) | |
| *B25J 15/00* | (2006.01) | |
| *B25J 17/00* | (2006.01) | |
| *B25J 19/00* | (2006.01) | |

(52) U.S. Cl.
CPC .............. *B25J 15/08* (2013.01); *B25J 9/106* (2013.01); *B25J 9/144* (2013.01); *B25J 15/0009* (2013.01); *B25J 17/00* (2013.01); *B25J 19/0029* (2013.01)

(58) Field of Classification Search
CPC ........ B25J 15/0009; B25J 15/08; B25J 17/00; B25J 19/0029; B25J 9/146; B25J 9/144
See application file for complete search history.

(56) References Cited

U.S. PATENT DOCUMENTS

| | | | |
|---|---|---|---|
| 9,492,929 B1* | 11/2016 | Strauss | F15B 15/2807 |
| 2012/0186383 A1* | 7/2012 | Schvalb | B25J 15/0009 |
| | | | 901/21 |
| 2017/0189257 A1* | 7/2017 | Lan | A63B 21/4017 |
| 2022/0193890 A1* | 6/2022 | Castro | B25J 9/1065 |

* cited by examiner

*Primary Examiner* — Charles A Fox
*Assistant Examiner* — Gregory T Prather
(74) *Attorney, Agent, or Firm* — Thomas Mahon

(57) ABSTRACT

A robotic joint has a first portion that includes a first actuator and a second actuator, a first spherical linkage having a first end mechanically coupled to the first actuator and a second end mechanically coupled to a second portion of the robotic joint, and a second spherical linkage having a third end mechanically coupled to the second actuator and a fourth end mechanically coupled to the second portion. The first and second spherical linkages are segments of a spherical shell. The first and second actuators are operable in combination to control movement of the second portion relative to the first portion with two degrees of freedom. Each actuator causes a first respective movement in the same direction as each other to control a flexion or an extension, and a second respective movement in opposite directions to each other to control an abduction or an adduction.

14 Claims, 17 Drawing Sheets

ROBOTIC JOINT HAVING A SPHERICAL LINKAGE

TECHNICAL FIELD

The present systems, devices, and methods generally relate to robotics, and particularly relate to joints in robotic digits.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Robots can be powered by hydraulic power systems, electric motors, and other power sources. Power can be distributed to a robot's components, e.g., actuators. Actuators can be used to convert energy into movement of the robot.

Robots typically have end effectors. Some end effectors include robotic digits. The end effectors of humanoid robots are referred to in the present application as robotic hands and/or robotic feet. The digits of robotic hands are referred to as robotic fingers and/or robotic thumbs. The digits of robotic feet are referred to as robotic toes. Robotic digits may have one or more joints including, for example, a joint at a knuckle.

BRIEF SUMMARY

A robotic joint may be summarized as comprising a first portion comprising a first actuator and a second actuator, a first spherical linkage having a first end mechanically coupled to the first actuator and a second end mechanically coupled to a second portion of the robotic joint, the first spherical linkage comprising a first segment of a spherical shell, and a second spherical linkage having a third end mechanically coupled to the second actuator and a fourth end mechanically coupled to the second portion, the second spherical linkage comprising a second segment of the spherical shell, wherein the first actuator and the second actuator are operable in combination to control movement of the second portion relative to the first portion with two degrees of freedom.

In some implementations, the first spherical linkage and the second spherical linkage are positioned about a center of the spherical shell.

In some implementations, the first actuator is a first hydraulic actuator and the second actuator is a second hydraulic actuator. The first hydraulic actuator may include a first hydraulic cylinder and a first hydraulic piston, the first hydraulic piston movable along a first longitudinal axis of the first hydraulic cylinder, and the second hydraulic actuator may include a second hydraulic cylinder and a second hydraulic piston, the second hydraulic piston movable along a second longitudinal axis of the second hydraulic cylinder, the first longitudinal axis parallel to the second longitudinal axis. The movement of the second portion relative to the first portion in a first degree of freedom of the two degrees of freedom may include a rotation about a first axis of rotation, the first axis of rotation perpendicular to the first longitudinal axis and lying in a plane that includes the first longitudinal axis and the second longitudinal axis. The movement of the second portion relative to the first portion of the robotic joint in a second degree of freedom of the two degrees of freedom may include a rotation about a second axis of rotation, the second axis of rotation perpendicular to the first longitudinal axis and perpendicular to the plane that includes the first longitudinal axis and the second longitudinal axis. The movement of the second portion relative to the first portion in a degree of freedom of the two degrees of freedom may include a rotation about an axis of rotation, the axis of rotation perpendicular to the first longitudinal axis and perpendicular to a plane that includes the first longitudinal axis and the second longitudinal axis.

In some implementations, at least one of the first actuator and the second actuator is a double-acting actuator.

In some implementations, a first degree of freedom of the two degrees of freedom includes at least one of a flexion or an extension, and a second degree of freedom of the two degrees of freedom includes at least one of an abduction or an adduction. The first actuator and the second actuator may each cause a first respective movement in the same direction as each other to control the at least one of a flexion or an extension, and the first actuator and the second actuator may each cause a second respective movement in opposite directions to each other to control the at least one of an abduction or an adduction.

In some implementations, the first portion comprises a first input ring, the first end of the first spherical linkage mechanically coupled to the first actuator via the first input ring, a second input ring, the third end of the second spherical linkage mechanically coupled to the second actuator via the second input ring, the plane of the second input ring parallel to the plane of the first input ring, and a first axle oriented along a first axis perpendicular to the plane of the first input ring and the plane of the second input ring, wherein the movement of the second portion relative to the first portion includes a rotation about the first axis, the rotation causing at least one of a flexion or an extension. The robotic joint may further comprise a hinge, the hinge comprising a second axle oriented along a second axis perpendicular to a plane that passes through a first longitudinal axis of the first actuator and a second longitudinal axis of the second actuator, wherein the movement of the second portion relative to the first portion may include a rotation about the second axis, the rotation causing at least one of an abduction or an adduction.

In some implementations, the robotic joint further comprises a hinge, the hinge comprising an axle oriented along an axis perpendicular to a plane that passes through a first longitudinal axis of the first actuator and a second longitudinal axis of the second actuator, wherein the movement of the second portion relative to the first portion includes a rotation about the axis, the rotation causing at least one of an abduction or an adduction.

In some implementations, the first portion further comprises a spring wherein the spring is operable to return the second portion to a baseline relative configuration of the first portion and the second portion. The baseline relative configuration may include at least approximately zero flexion, at least approximately zero extension, at least approximately zero abduction, and at least approximately zero adduction of the robotic joint.

In some implementations, the robotic joint further comprises a passage to accommodate at least one of an electrical wire or a hydraulic hose that passes from the first portion to the second portion.

In some implementations, the robotic joint further comprises a passage, and at least one of an electrical wire or a hydraulic hose that passes from the first portion to the second portion via the passage.

In some implementations, the robotic joint is a metacarpophalangeal (MCP) joint of a humanoid robot.

A robotic digit may be summarized as comprising a base portion, and a proximal portion, the proximal portion mechanically coupled to the base portion via a first robotic joint, the first robotic joint comprising a first portion, the first portion comprising a first actuator and a second actuator, a first spherical linkage having a first end mechanically coupled to the first actuator and a second end mechanically coupled to a second portion of the first robotic joint, the first spherical linkage comprising a first segment of a first spherical shell, and a second spherical linkage having a third end mechanically coupled to the second actuator and a fourth end mechanically coupled to the second portion, the second spherical linkage comprising a second segment of the first spherical shell, wherein the first actuator and the second actuator are operable in combination to control movement of the second portion relative to the first portion with two degrees of freedom.

In some implementations, the first spherical linkage and the second spherical linkage are positioned about a center of the first spherical shell.

In some implementations, the first actuator is a first hydraulic actuator and the second actuator is a second hydraulic actuator. The first hydraulic actuator may include a first hydraulic cylinder and a first hydraulic piston, the first hydraulic piston movable along a first longitudinal axis of the first hydraulic cylinder, and the second hydraulic actuator may include a second hydraulic cylinder and a second hydraulic piston, the second hydraulic piston movable along a second longitudinal axis of the second hydraulic cylinder, the first longitudinal axis parallel to the second longitudinal axis. The movement of the second portion relative to the first portion in a first degree of freedom of the two degrees of freedom may include a rotation about a first axis of rotation, the first axis of rotation perpendicular to the first longitudinal axis and lying in a plane that includes the first longitudinal axis and the second longitudinal axis. The movement of the second portion relative to the first portion in a second degree of freedom of the two degrees of freedom may includes a rotation about a second axis of rotation, the second axis of rotation perpendicular to the first longitudinal axis and perpendicular to the plane that includes the first longitudinal axis and the second longitudinal axis. The movement of the second portion relative to the first portion in a degree of freedom of the two degrees of freedom may include a rotation about an axis of rotation, the axis of rotation perpendicular to the first longitudinal axis and perpendicular to a plane that includes the first longitudinal axis and the second longitudinal axis.

In some implementations, at least one of the first actuator and the second actuator is a double-acting actuator.

In some implementations, a first degree of freedom of the two degrees of freedom includes at least one of a flexion or an extension, and a second degree of freedom of the two degrees of freedom includes at least one of an abduction or an adduction. The first actuator and the second actuator may each cause a first respective movement in the same direction as each other to control the at least one of a flexion or an extension, and the first actuator and the second actuator may each cause a second respective movement in opposite directions to each other to control the at least one of an abduction or an adduction.

In some implementations, the first portion of the robotic joint comprises a first input ring, the first end of the first spherical linkage mechanically coupled to the first actuator via the first input ring, a second input ring, the third end of the second spherical linkage mechanically coupled to the second actuator via the second input ring, the plane of the second input ring parallel to the plane of the first input ring, and a first axle oriented along a first axis perpendicular to the plane of the first input ring and the plane of the second input ring, wherein the movement of the second portion relative to the first portion includes a rotation about the first axis, the rotation causing at least one of a flexion or an extension. The first robotic joint may comprise a hinge, the hinge comprising a second axle oriented along a second axis perpendicular to a plane that passes through a first longitudinal axis of the first actuator and a second longitudinal axis of the second actuator, wherein the movement of the second portion relative to the first portion may include a rotation about the second axis, the rotation causing at least one of an abduction or an adduction.

In some implementations, the first robotic joint comprises a hinge, the hinge comprising an axle oriented along an axis perpendicular to a plane that passes through a first longitudinal axis of the first actuator and a second longitudinal axis of the second actuator, wherein the movement of the second portion relative to the first portion includes a rotation about the axis, the rotation causing at least one of an abduction or an adduction.

In some implementations, the first portion further comprises a spring wherein the spring is operable to return the second portion to a baseline relative configuration of the first and the second portion. The baseline relative configuration may include at least approximately zero flexion, at least approximately zero extension, at least approximately zero abduction, and at least approximately zero adduction of the robotic joint.

In some implementations, the robotic digit further comprises a passage to accommodate at least one of an electrical wire or a hydraulic hose that passes from the first portion to the second portion.

In some implementations, the robotic digit further comprises a passage, and at least one of an electrical wire or a hydraulic hose that passes from the first portion to the second portion via the passage.

In some implementations, the robotic digit is a finger of a humanoid robot, the base portion is a metacarpal, the proximal portion is a proximal phalange, and the first robotic joint is a metacarpophalangeal (MCP) joint.

In some implementations, the robotic digit further comprises a distal portion, the distal portion mechanically coupled to the proximal portion via a second robotic joint, the second robotic joint comprising a third portion, the third portion comprising a third actuator and a fourth actuator, a third spherical linkage having a fifth end mechanically coupled to the third actuator and a sixth end mechanically coupled to a fourth portion, the third spherical linkage comprising a third segment of a second spherical shell, and a fourth spherical linkage having a seventh end mechanically coupled to the second actuator and an eighth end mechanically coupled to the fourth portion, the fourth spherical linkage comprising a fourth segment of the second spherical shell, wherein the third actuator and the fourth actuator are operable in combination to control movement of the fourth portion relative to the third portion with two degrees of freedom. The robotic digit may be a finger of a humanoid robot, the base portion may be a metacarpal, the proximal portion may be a proximal phalange, the distal portion may be a middle phalange, the first robotic joint may be a metacarpophalangeal (MCP) joint, and the second robotic joint may be a proximal interphalangeal (PIP) joint.

A robotic end effector may be summarized as comprising a first robotic digit, the first robotic digit comprising a first base portion, and a first proximal portion, the first proximal portion mechanically coupled to the first base portion via a first robotic joint, the first robotic joint comprising a first portion, the first portion comprising a first actuator and a second actuator, a first spherical linkage having a first end mechanically coupled to the first actuator and a second end mechanically coupled to a second portion of the first robotic joint, the first spherical linkage comprising a first segment of a first spherical shell, and a second spherical linkage having a third end mechanically coupled to the second actuator and a fourth end mechanically coupled to the second portion, the second spherical linkage comprising a second segment of the first spherical shell, wherein the first actuator and the second actuator are operable in combination to control movement of the second portion relative to the first portion with two degrees of freedom.

In some implementations, the first spherical linkage and the second spherical linkage are positioned about a center of the first spherical shell.

In some implementations, the first actuator is a first hydraulic actuator and the second actuator is a second hydraulic actuator. The first hydraulic actuator may include a first hydraulic cylinder and a first hydraulic piston, the first hydraulic piston movable along a first longitudinal axis of the first hydraulic cylinder, and the second hydraulic actuator may include a second hydraulic cylinder and a second hydraulic piston, the second hydraulic piston movable along a second longitudinal axis of the second hydraulic cylinder, the first longitudinal axis parallel to the second longitudinal axis. The movement of the second portion relative to the first portion in a first degree of freedom of the two degrees of freedom may include a rotation about a first axis of rotation, the first axis of rotation perpendicular to the first longitudinal axis and lying in a plane that includes the first longitudinal axis and the second longitudinal axis. The movement of the second portion relative to the first portion in a second degree of freedom of the two degrees of freedom may include a rotation about a second axis of rotation, the second axis of rotation perpendicular to the first longitudinal axis and perpendicular to the plane that includes the first longitudinal axis and the second longitudinal axis. The movement of the second portion relative to the first portion in a degree of freedom of the two degrees of freedom may include a rotation about an axis of rotation, the axis of rotation perpendicular to the first longitudinal axis and perpendicular to a plane that includes the first longitudinal axis and the second longitudinal axis.

In some implementations, at least one of the first actuator and the second actuator is a double-acting actuator.

In some implementations, a first degree of freedom of the two degrees of freedom includes at least one of a flexion or an extension, and a second degree of freedom of the two degrees of freedom includes at least one of an abduction or an adduction. The first actuator and the second actuator may each cause a first respective movement in the same direction as each other to control the at least one of a flexion or an extension, and the first actuator and the second actuator may each cause a second respective movement in opposite directions to each other to control the at least one of an abduction or an adduction.

In some implementations, the first portion further comprises a first input ring, the first end of the first spherical linkage mechanically coupled to the first actuator via the first input ring, a second input ring, the third end of the second spherical linkage mechanically coupled to the second actuator via the second input ring, the plane of the second input ring parallel to the plane of the first input ring, and a first axle oriented along a first axis perpendicular to the plane of the first input ring and the plane of the second input ring, wherein the movement of the second portion relative to the first portion includes a rotation about the first axis, the rotation causing at least one of a flexion or an extension. The first robotic joint may further comprise a hinge, the hinge comprising a second axle oriented along a second axis perpendicular to a plane that passes through a first longitudinal axis of the first actuator and a second longitudinal axis of the second actuator, wherein the movement of the second portion relative to the first portion may include a rotation about the second axis, the rotation causing at least one of an abduction or an adduction.

In some implementations, the first robotic joint further comprises a hinge, the hinge comprising an axle oriented along an axis perpendicular to a plane that passes through a first longitudinal axis of the first actuator and a second longitudinal axis of the second actuator, wherein the movement of the second portion relative to the first portion includes a rotation about the axis, the rotation causing at least one of an abduction or an adduction.

In some implementations, the first portion further comprises a spring wherein the spring is operable to return the second portion to a baseline relative configuration of the first and the second portion. The baseline relative configuration may include at least approximately zero flexion, at least approximately zero extension, at least approximately zero abduction, and at least approximately zero adduction of the first robotic joint.

In some implementations, the robotic end effector further comprises a passage to accommodate at least one of an electrical wire or a hydraulic hose that passes from the first portion to the second portion.

In some implementations, the robotic digit further comprises a passage, and at least one of an electrical wire or a hydraulic hose that passes from the first portion to the second portion via the passage.

In some implementations, the robotic digit is a finger of a humanoid robot, the first base portion is a metacarpal, the first proximal portion is a proximal phalange, and the first robotic joint is a metacarpophalangeal (MCP) joint.

In some implementations, the first robotic digit further comprises a distal portion, the distal portion mechanically coupled to the first proximal portion via a second robotic joint, the second robotic joint comprising a third portion, the third portion comprising a third actuator and a fourth actuator, a third spherical linkage having a fifth end mechanically coupled to the third actuator and a sixth end mechanically coupled to a fourth portion, the third spherical linkage comprising a third segment of a second spherical shell, and a fourth spherical linkage having a seventh end mechanically coupled to the second actuator and an eighth end mechanically coupled to the fourth portion, the fourth spherical linkage comprising a fourth segment of the second spherical shell, wherein the third actuator and the fourth actuator are operable in combination to control movement of the fourth portion relative to the third portion with two degrees of freedom. The robotic digit may be a finger of a humanoid robot, the first base portion may be a metacarpal, the first proximal portion may be a proximal phalange, the distal portion may be a middle phalange, the first robotic joint may be a metacarpophalangeal (MCP) joint, and the second robotic joint may be a proximal interphalangeal (PIP) joint.

In some implementations, the robotic end effector further comprises a second robotic digit, the second robotic digit comprising a second base portion, and a second proximal portion, the second proximal portion mechanically coupled to the second base portion via a second robotic joint, the second robotic joint comprising a third portion, the third portion comprising a third actuator and a fourth actuator, a third spherical linkage having a fifth end mechanically coupled to the third actuator and a sixth end mechanically coupled to a fourth portion of the second robotic joint, the third spherical linkage comprising a third segment of a second spherical shell, and a fourth spherical linkage having a seventh end mechanically coupled to the fourth actuator and an eighth end mechanically coupled to the fourth portion, the fourth spherical linkage comprising a fourth segment of the second spherical shell, wherein the third actuator and the fourth actuator are operable in combination to control movement of the fourth portion relative to the third portion with two degrees of freedom.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1A:
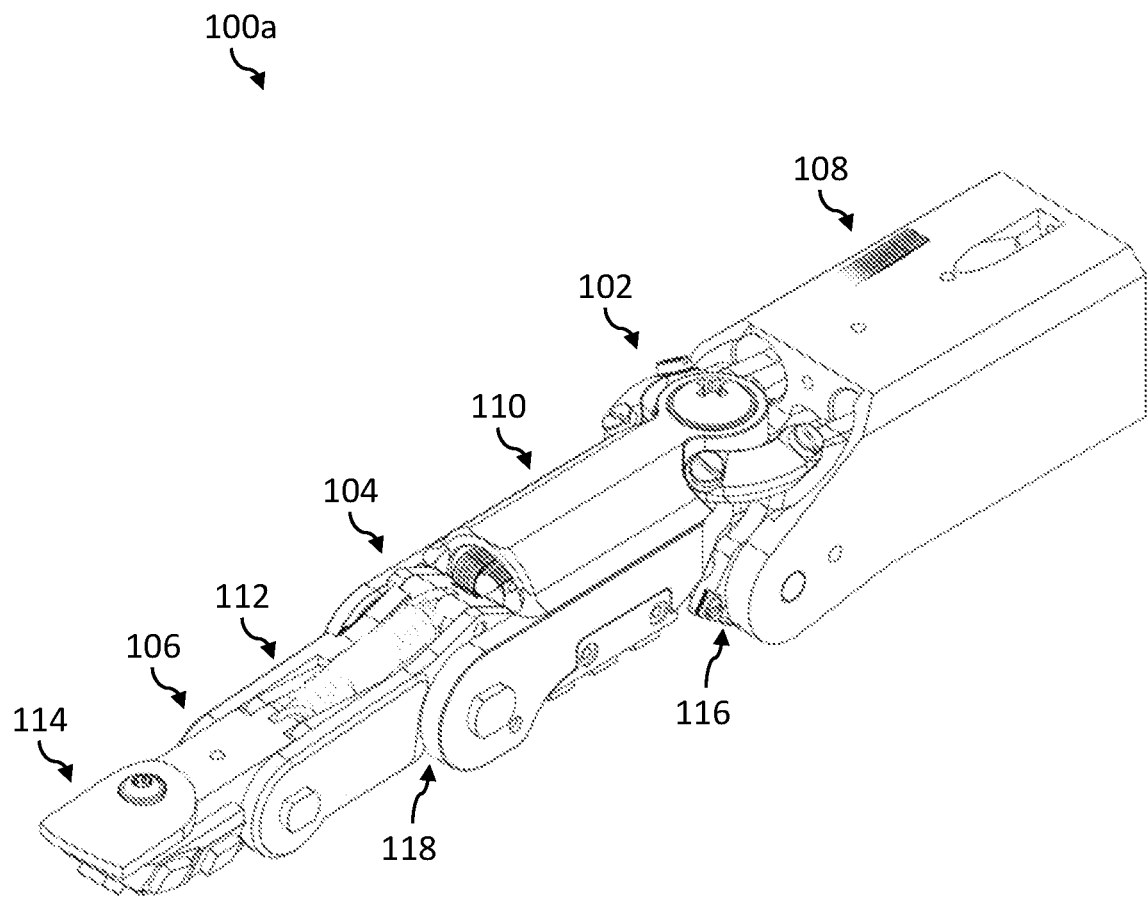
FIG. 1A is a schematic drawing of an example implementation of a robotic digit shown from above, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The technology described below includes elements of a robust and versatile design for a robotic digit capable of emulating movements and poses of a human digit. In particular, the technology includes elements that can match a form factor and degrees of freedom of a human digit. One aspect includes a metacarpophalangeal joint (MCP) capable of flexion/extension and abduction/adduction movements.

The MCP joint can also advantageously provide a passage for electrical wiring and/or hydraulic hoses. Electrical wiring can provide electrical communicative coupling between power supplies, controllers and/or other electrical devices and sensors located on the robotic digit. Sensors can include, for example, position transducers, haptic/tactile sensors, and the like. Hydraulic hoses can provide hydraulic communicative coupling to hydraulic actuators at the proximal interphalangeal (PIP) joint and/or the distal interphalangeal (DIP) joint.

The technology described below can advantageously support the control and performance of a humanoid robot's dexterous hands, for example, in situations where a robot is tasked with grasping objects in its external environment that have different form factors.

In some implementations, the technology includes a hydraulically-activated spherical differential technology that includes a pair of spherical linkages able to provide abduction/adduction and flexion/extension movements using a pair of hydraulic actuators operating in concert. In these implementations, both degrees of freedom are made possible by a single pivot joint, for example, an MCP joint. The movements can be made without the use of gears, and without requiring a particular sequence of motion. Furthermore, the technology can be integrated with position transducers to provide accurate control of the digit's position and attitude. Exemplary position transducers that may be integrated with the present systems, devices, and methods include, without limitation, those described in U.S. Provisional patent Application Ser. No. 63/323,897, filed Mar. 22, 2022 and entitled "SYSTEMS, DEVICES, AND METHODS FOR A ROBOTIC DIGIT AND DETERMINING MOTIONS AND POSITIONS THEREOF", which is incorporated by reference herein in its entirety.

In operation, a common movement of a respective hydraulic piston of each hydraulic actuator can control a flexion/extension movement of the digit. A differential movement of a respective hydraulic piston of each hydraulic actuator can control an abduction/adduction movement of the digit.

FIG. 1A is a schematic drawing of an example implementation of a robotic digit 100*a* shown from above, in accordance with the present systems, devices, and methods. Digit 100*a* is analogous to a human finger, therefore digit 100*a* is described below in terms that can be used to describe the anatomy of a humanoid digit (e.g., a thumb or a finger).

Digit 100*a* includes a metacarpophalangeal (MCP) joint 102, a proximal interphalangeal (PIP) joint 104, and a distal interphalangeal (DIP) joint 106. MCP joint 102 joins a metacarpal 108 and a proximal phalange 110. PIP joint 104 joins proximal phalange 110 and a middle phalange 112. DIP joint 106 joins middle phalange 112 and a distal phalange 114.

MCP joint 102 is a spherical differential joint described in more detail below. MCP joint 102 may be hydraulically-activated. MCP joint 102 can provide movement of proximal phalange 110 relative to metacarpal 108. MCP joint 102 has two degrees of freedom. The two degrees of freedom may be flexion/extension and abduction/adduction. Flexion is a bending of digit 100*a* at MCP joint 102, and extension is a straightening of digit 100*a* at MCP joint 102. Abduction is a movement of proximal phalange 110 away from a midline of digit 100*a*, and adduction is a movement of proximal phalange 100 toward the midline of digit 100*a*.

Digit 100*a* includes a position transducer 116 on a left-hand side of MCP 102, and a position transducer 118 on a left-hand side of PIP 104. In some implementations, digit 100*a* includes a position transducer (not shown in FIG. 1A) at DIP 106. Position transducer 116 is operable to determine a relative orientation of metacarpal 108 and proximal phalange 110. The relative orientation of metacarpal 108 and proximal phalange 110 may include a flexion/extension and/or an abduction/adduction. Similarly, position transducer 118 is operable to determine a relative orientation of proximal phalange 110 and middle phalange 112 which may include a flexion/extension and/or an abduction/adduction. Each of position transducers 116 and 118 may send a respective signal to a controller (not shown in FIG. 1A) where each signal includes the respective relative orientation described above. Each signal may be part of a respective feedback loop used to control a movement of digit 100*a*.

Figure 1B:
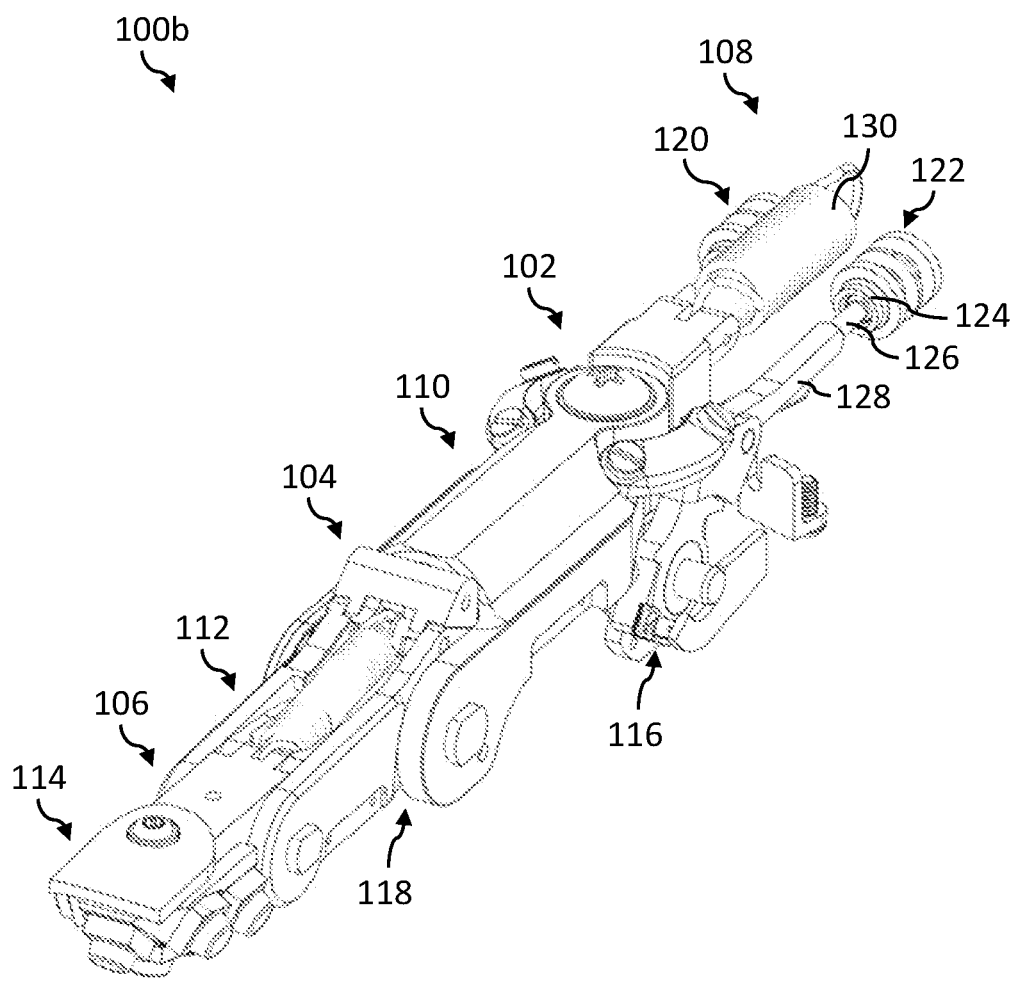
FIG. 1B is a schematic drawing of a portion of the robotic digit of FIG. 1A, in accordance with the present systems, devices, and methods.

FIG. 1B is a schematic drawing of a portion 100*b* of robotic digit 100*a* of FIG. 1A, in accordance with the present systems, devices, and methods. Portion 100*b* is the same as or similar to digit 100*a* of FIG. 1A with elements of metacarpal 108 of digit 100*a* of FIG. 1A removed to show certain interior elements described below. The same reference numbers have been used for elements of portion 100*b* that are the same as or similar to elements of digit 100*a* of FIG. 1A. Elements 102, 104, 106, 108, 110, 112, 114, 116, and 118 of portion 100*b* were described above with reference to FIG. 1A.

Portion 100*b* includes hydraulic actuators 120 and 122. Hydraulic actuator 122 includes a hydraulic cylinder 124 and a hydraulic piston 126. Hydraulic piston 126 is mechanically coupled to MCP joint 102 by a coupling arm 128. Similarly, hydraulic actuator 120 includes a hydraulic cylinder, a hydraulic piston, and a coupling arm (not shown in FIG. 1B).

Portion 100*b* also includes a spring 130. Spring 130 can be configured to return digit 100*a* of FIG. 1A to a baseline relative configuration. In an example implementation, the baseline relative configuration is one in which there is zero flexion/extension and zero abduction/adduction of proximal phalange 110 relative to metacarpal 108.

In some implementations, hydraulic actuators 120 and 122 may be replaced by other types of actuator, for example, pneumatic actuators (which use compressed air to produce movement), cable actuators, and/or electric actuators (which convert AC or DC electric energy into linear or rotary motion). In some implementations, at least one of the actuators (for example, at least one of hydraulic actuators 120 and 122) is a single-acting actuator. In some implementations, at least one of the actuators is a double-acting actuator.

Figure 1C:
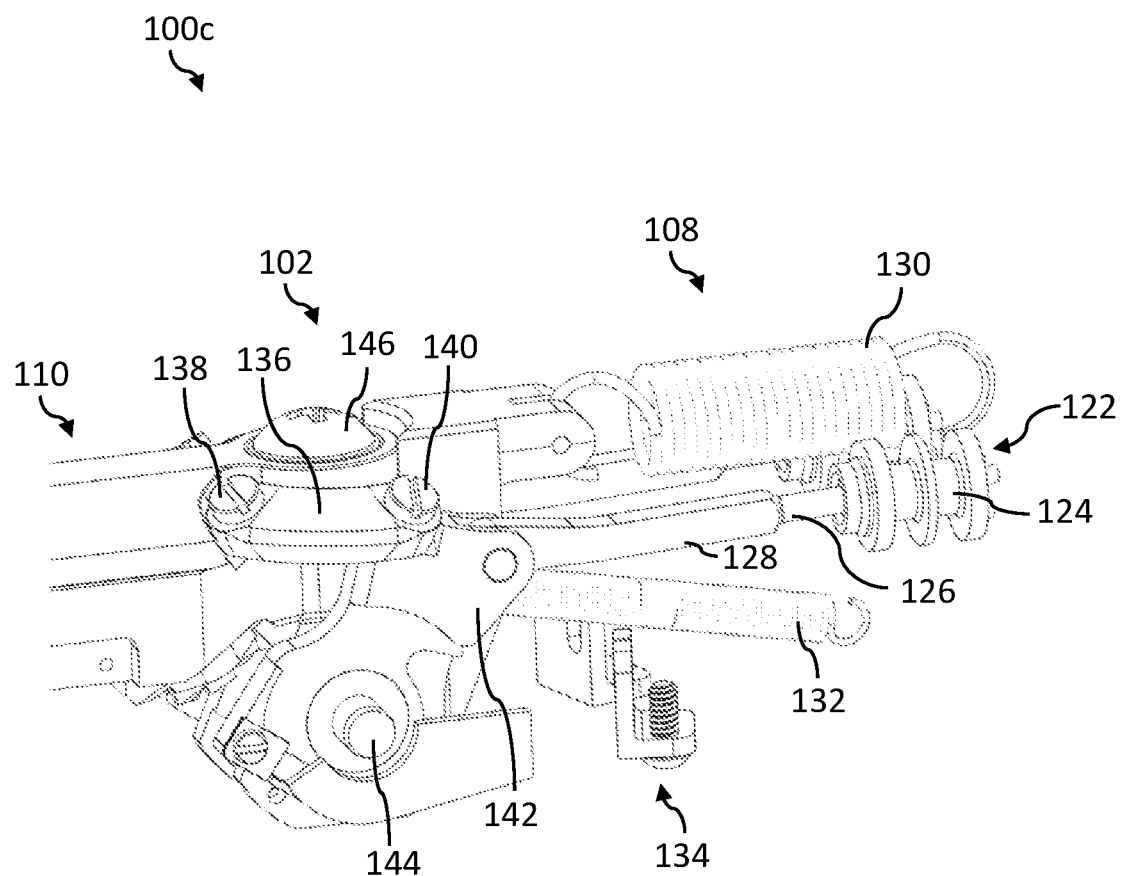
FIG. 1C is a schematic drawing of another portion of the robotic digit of FIG. 1A, in accordance with the present systems, devices, and methods.

FIG. 1C is a schematic drawing of another portion 100*c* of robotic digit 100*a* of FIG. 1A, in accordance with the present systems, devices, and methods. Like portion 100*b* of FIG. 1B, portion 100*c* is the same as or similar to digit 100*a* of FIG. 1A with elements of metacarpal 108 of digit 100*a* of FIG. 1A removed to show certain interior elements. The same reference numbers have been used for elements of portion 100c that are the same as or similar to elements of digit 100a of FIG. 1A and elements of portion 100b of FIG. 1B. Elements 102, 104, 106, 108, 110, 112, 114, 116, 118, 122, 124, 126, 128, and 130 of portion 100c were described above with reference to FIGS. 1A and 1B.

Portion 100c also includes a spring 132 which can be configured, for example in conjunction with spring 130, to return digit 100a of FIG. 1A to the baseline relative configuration described above. Portion 100c also includes a mounting 134.

Portion 100c includes a spherical linkage 136, and screws 138 and 140 for mounting spherical linkage 136 to MCP joint 102. In some implementations, spherical linkage includes or consists of 7075 aluminum alloy.

Portion 100c also includes an input ring 142 and an axle 144. One end of spherical linkage 136 is mechanically coupled to actuator 122 via input ring 142. Axle 144 is perpendicular to the plane of input ring 142. A rotation of proximal phalange 110 about axle 144 can cause at least one of a flexion or an extension.

Portion 100c also includes a hinge 146. An axis of rotation (axis 316 of FIG. 3) of hinge 146 is perpendicular to axle 144. A rotation of proximal phalange 110 about hinge 146 can cause at least one of an abduction or an adduction.

Figure 2A:
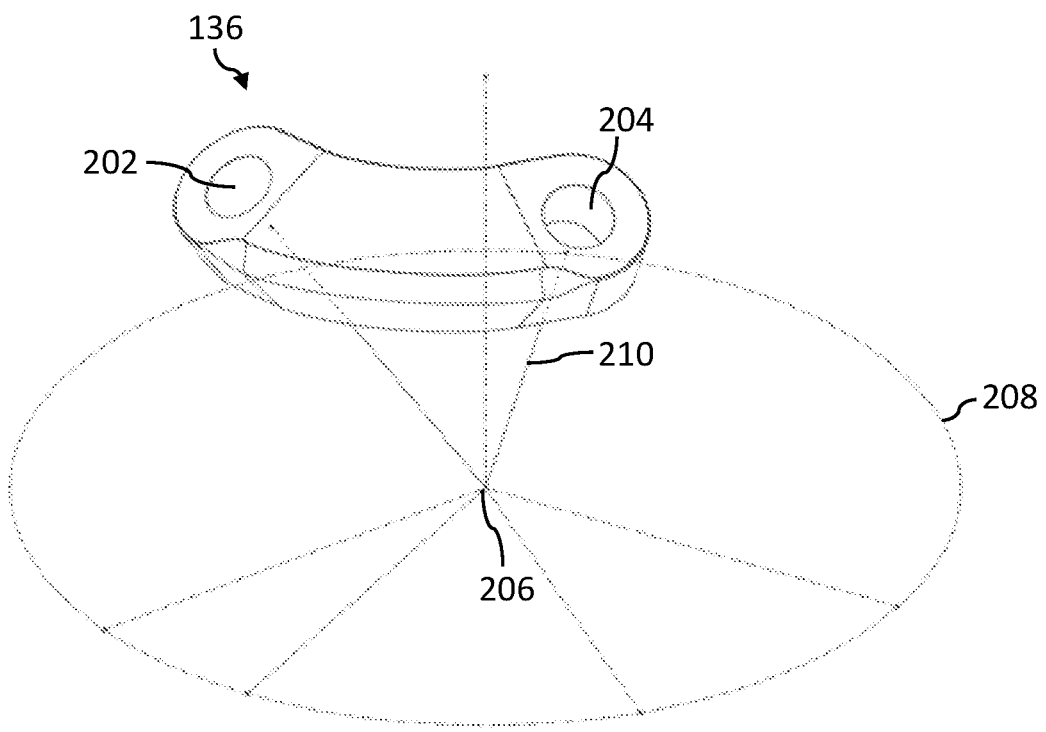
FIG. 2A is a schematic drawing of one of the spherical linkages of the robotic digit of FIG. 1A, in accordance with the present systems, devices, and methods.

FIG. 2A is a schematic drawing of one of the spherical linkages 136 of robotic digit 100a of FIG. 1A, in accordance with the present systems, devices, and methods. Spherical linkage 136 includes through-holes 202 and 204 for a mounting of spherical linkage 136 to robotic digit 100a of FIG. 1A.

Spherical linkage 136 is a segment of a spherical shell having a center 206. The spherical shell is a region between two concentric spheres (both centered at 206) of differing radii. The spherical shell has an equator 208 and an inner radius 210.

Figure 2B:
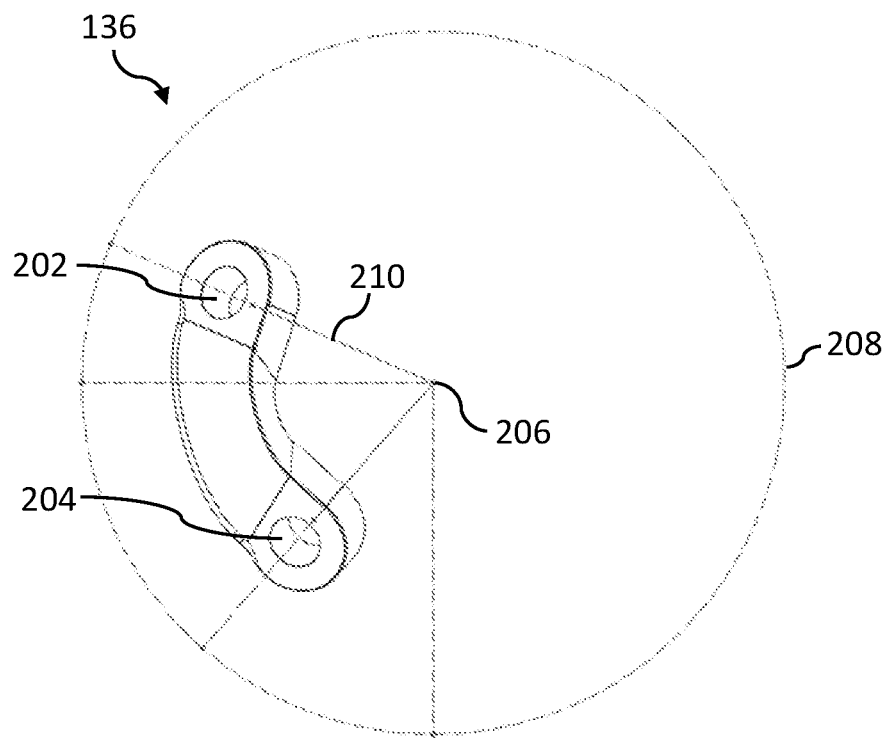
FIG. 2B is a plan view of the spherical linkage of FIG. 2A, in accordance with the present systems, devices, and methods.
Figure 2C:
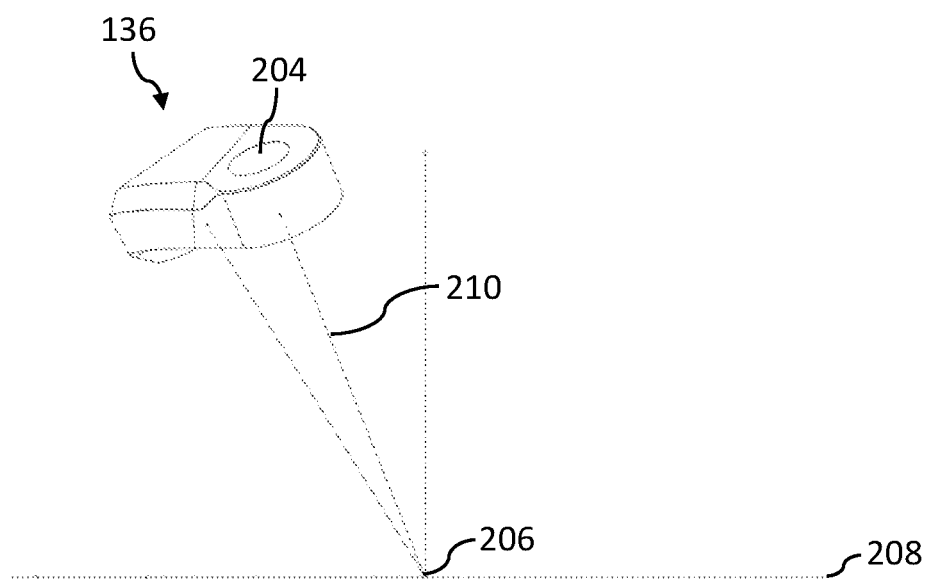
FIG. 2C is a side view of the spherical linkage of FIG. 2A, in accordance with the present systems, devices, and methods.

FIG. 2B is a plan view of spherical linkage 136 of FIG. 2A, in accordance with the present systems, devices, and methods. FIG. 2C is a side view of spherical linkage 136 of FIG. 2A, in accordance with the present systems, devices, and methods.

Figure 3:
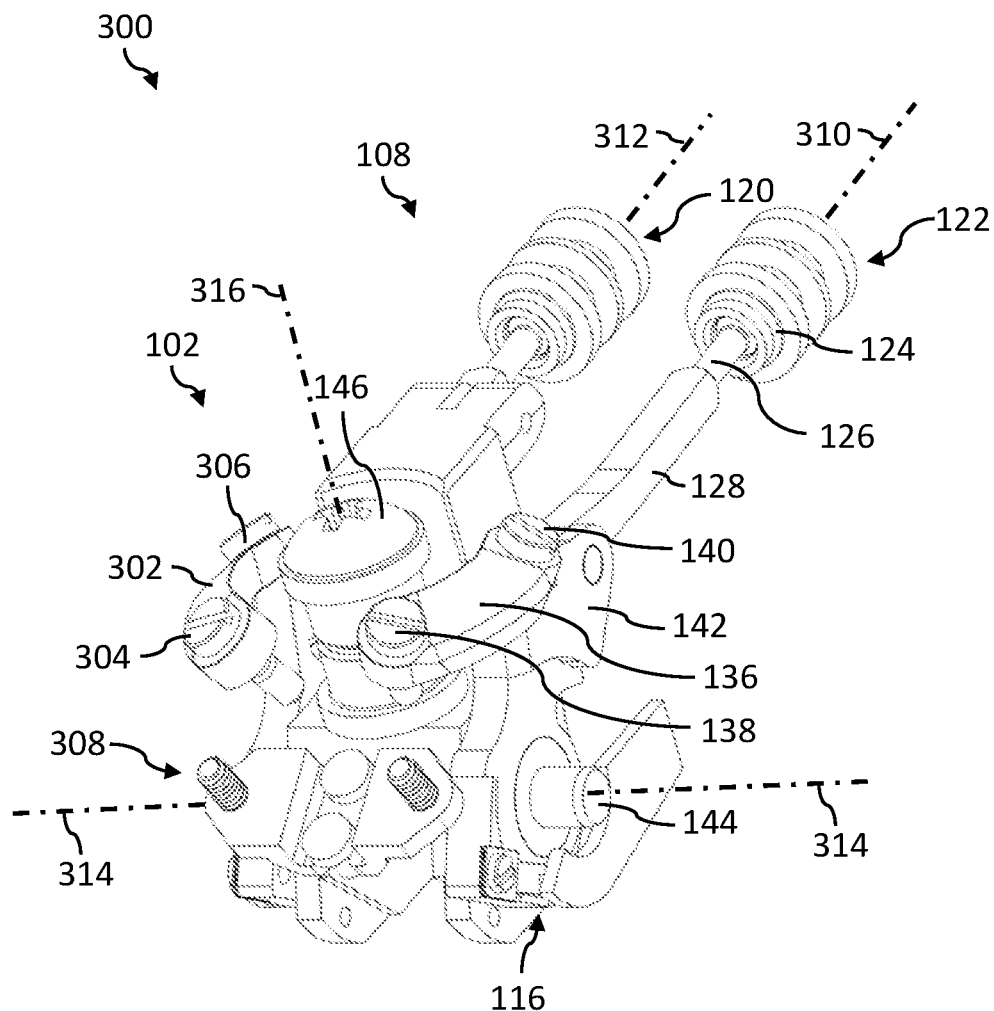
FIG. 3 is a schematic drawing of a portion of the robotic digit of FIG. 1A without the proximal phalange, in accordance with the present systems, devices, and methods.

FIG. 3 is a schematic drawing of a portion 300 of robotic digit 100a of FIG. 1A without the proximal phalange, in accordance with the present systems, devices, and methods. Portion 300 is the same as or similar to digit 100a of FIG. 1A with elements of proximal phalange 110 of digit 100a of FIG. 1A removed to show certain interior elements of MCP joint 102 described below. The same reference numbers have been used for elements of portion 300 that are the same as or similar to elements of digit 100a of FIG. 1A, and portions 100b and 100c of FIGS. 1B and 1C, respectively. Elements 102, 108, 116, and 118 of portion 300 were described above with reference to FIG. 1A. Elements 120, 122, 124, 126, and 128 of portion 300 were described above with reference to FIG. 1B. Elements 136, 138, 140, 142, 144, and 146 of portion 300 were described above with reference to FIG. 1C.

Portion 300 includes a spherical linkage 302, and screws 304 and 306 for mounting spherical linkage 302 to MCP joint 102.

Portion 300 also includes a screw mount 308 for mounting proximal phalange 110 of FIG. 1A (not shown in FIG. 3) to MCP joint 102.

Hydraulic piston 126 of hydraulic actuator 122 is movable along a longitudinal axis 310. Similarly, a hydraulic piston (not shown in FIG. 3) of hydraulic actuator 120 is movable along a longitudinal axis 312. Longitudinal axes 310 and 312 are parallel to each other.

Axle 144 is parallel to a longitudinal axis 314. Axis 314 is perpendicular to each of axes 310 and 312. Rotation of proximal phalange 110 about axis 314 can cause at least one of a flexion or an extension.

Figure 4A:
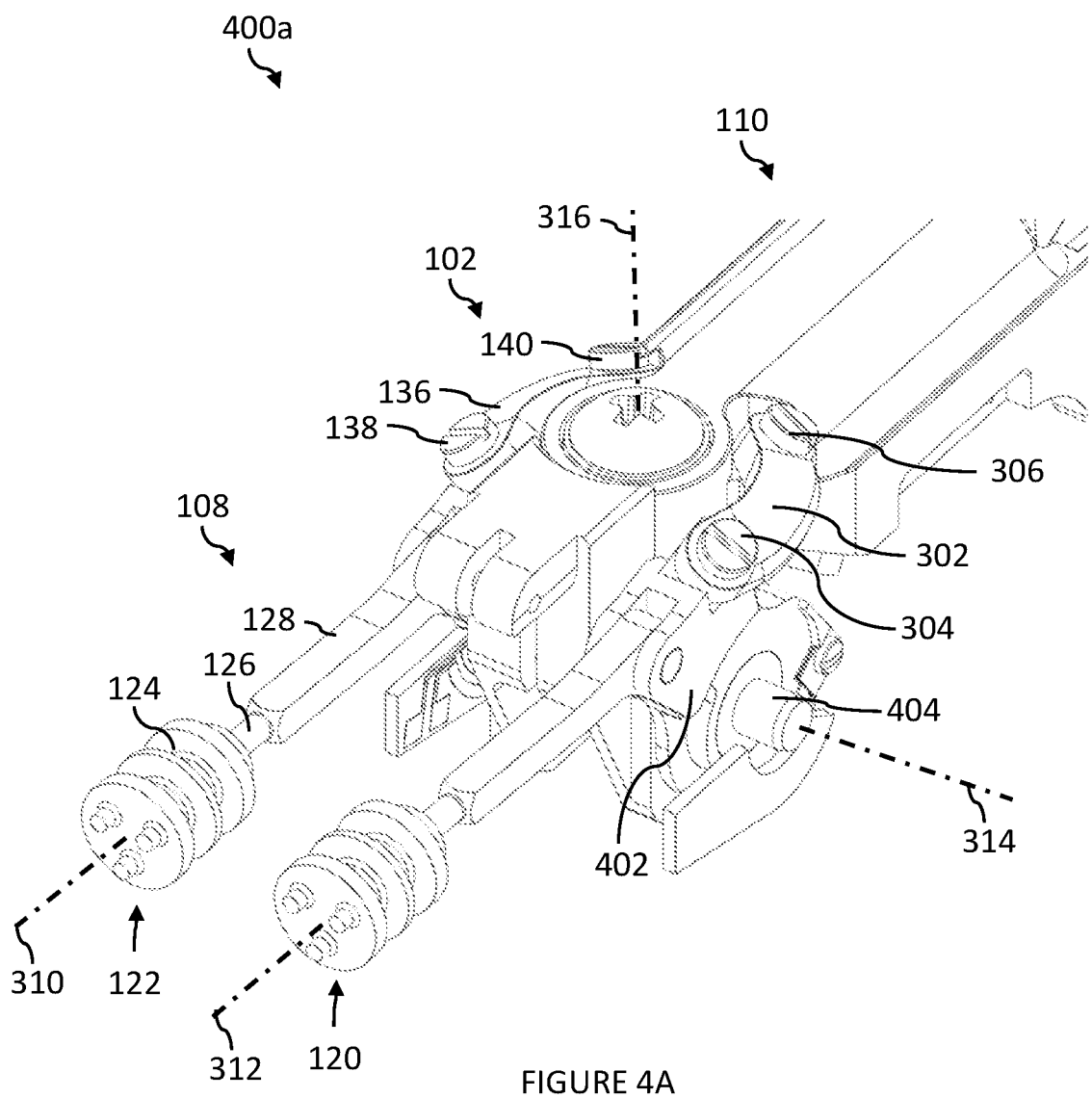
FIG. 4A is a schematic drawing of the upper side of a portion of the robotic digit of FIG. 1A with elements of the MCP joint of FIG. 1A removed to show the hydraulic actuators, in accordance with the present systems, devices, and methods.

Hinge 146 has a longitudinal axis 316. Axis 316 is perpendicular to each of axes 310 and 312, and axis 314. A rotation of proximal phalange 110 about axis 316 can cause at least one of an abduction or an adduction. FIG. 4A is a schematic drawing of the upper side of a portion 400a of the robotic digit of FIG. 1A with elements of the MCP joint of FIG. 1A removed to show the hydraulic actuators, in accordance with the present systems, devices, and methods. Portion 400a is the same as or similar to digit 100a of FIG. 1A with elements of metacarpal 108 of digit 100a of FIG. 1A removed to show certain interior elements of MCP joint 102 described below. The same reference numbers have been used for elements of portion 400a that are the same as or similar to elements of digit 100a of FIG. 1A, portions 100b and 100c of FIGS. 1B and 1C, respectively, and portion 300 of FIG. 3. Elements 102, 108, and 110 of portion 400a were described above with reference to FIG. 1A. Elements 120, 122, 124, 126, and 128 of portion 400a were described above with reference to FIG. 1B. Elements 136, 138, and 140 of portion 400a were described above with reference to FIG. 1C. Axes 310, 312, 314, and 316 were described above with reference to FIG. 3.

Portion 400a includes an input ring 402 on the right-side of MCP joint 102 and an axle 404.

Figure 4B:
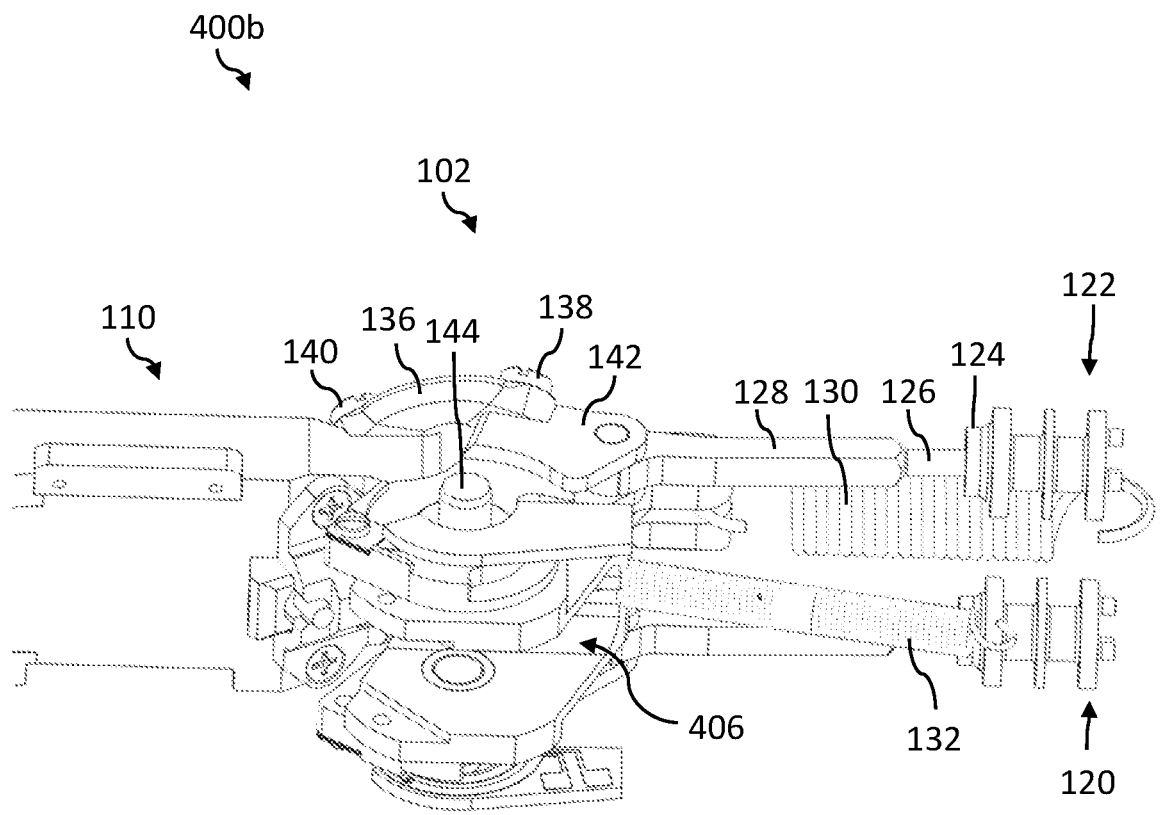
FIG. 4B is a schematic drawing of the underside of a portion of the robotic digit of FIG. 1A with elements of the MCP joint of FIG. 1A removed to show the hydraulic actuators and the return springs, in accordance with the present systems, devices, and methods.

FIG. 4B is a schematic drawing of the underside of a portion 400b of the robotic digit of FIG. 1A with elements of the MCP joint of FIG. 1A removed to show the hydraulic actuators and the return springs, in accordance with the present systems, devices, and methods. Portion 400b is the same as or similar to digit 100a of FIG. 1A with elements of metacarpal 108 of digit 100a of FIG. 1A removed to show certain interior elements of MCP joint 102 described below. The same reference numbers have been used for elements of portion 400b that are the same as or similar to elements of digit 100a of FIG. 1A, as shown and described with respect to FIGS. 1A, 1B, 1C, 3, and 4A.

Portion 440b includes a passage 406 through which electrical wiring and/or hydraulic hoses can be passed.

Figure 5A:
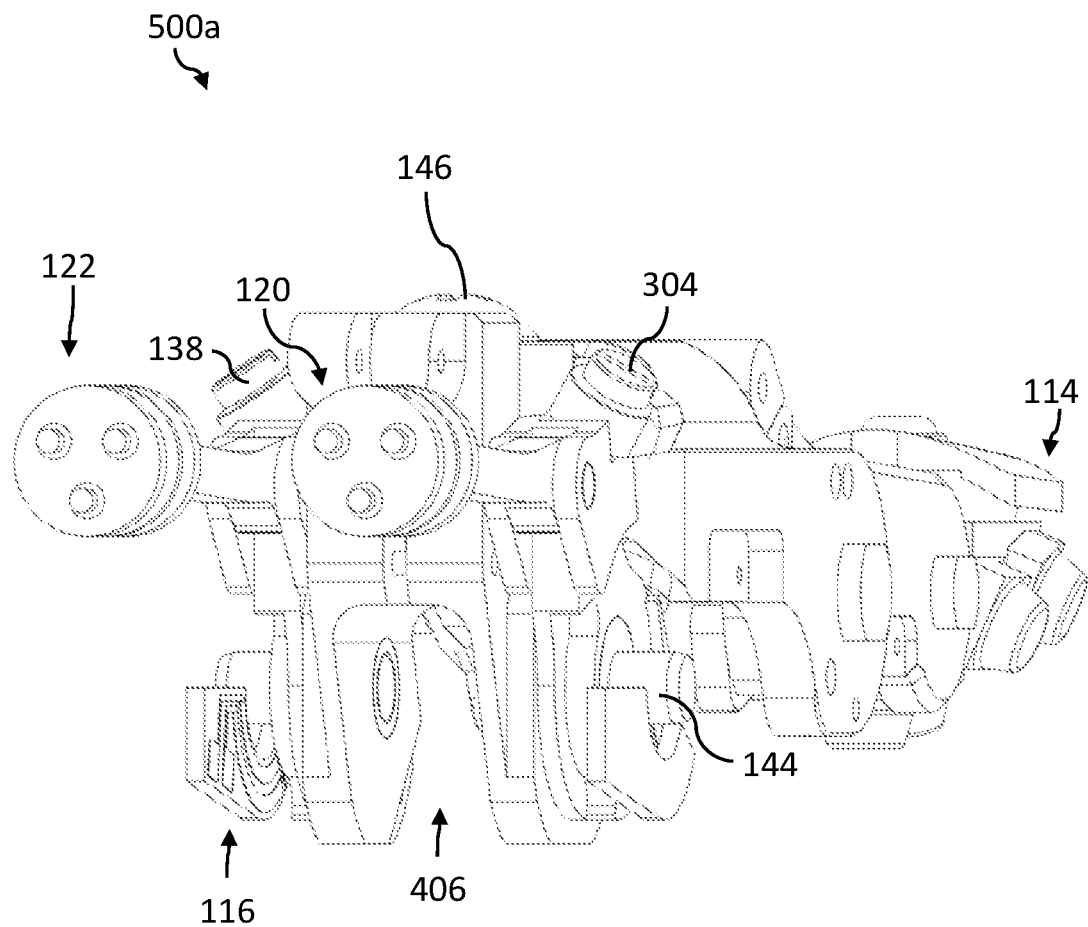
FIG. 5A is a schematic drawing of a portion of the robotic digit of FIG. 1A showing an oblique view from the metacarpal side of the MCP joint, in accordance with the present systems, devices, and methods.

FIG. 5A is a schematic drawing of a portion 500 of robotic digit 100a of FIG. 1A shown in an oblique view from the metacarpal side of the MCP joint, in accordance with the present systems, devices, and methods. Portion 500 is the same as or similar to digit 100a of FIG. 1A with elements of metacarpal 108 of digit 100a of FIG. 1A removed to show certain interior elements of MCP joint 102 described below. The same reference numbers have been used for elements of portion 500 that are the same as or similar to elements of digit 100a of FIG. 1A, as shown and described with respect to FIGS. 1A, 1B, 1C, 3, 4A, and 4B, including passage 406 through which electrical wiring and/or hydraulic hoses can be passed.

Figure 5B:
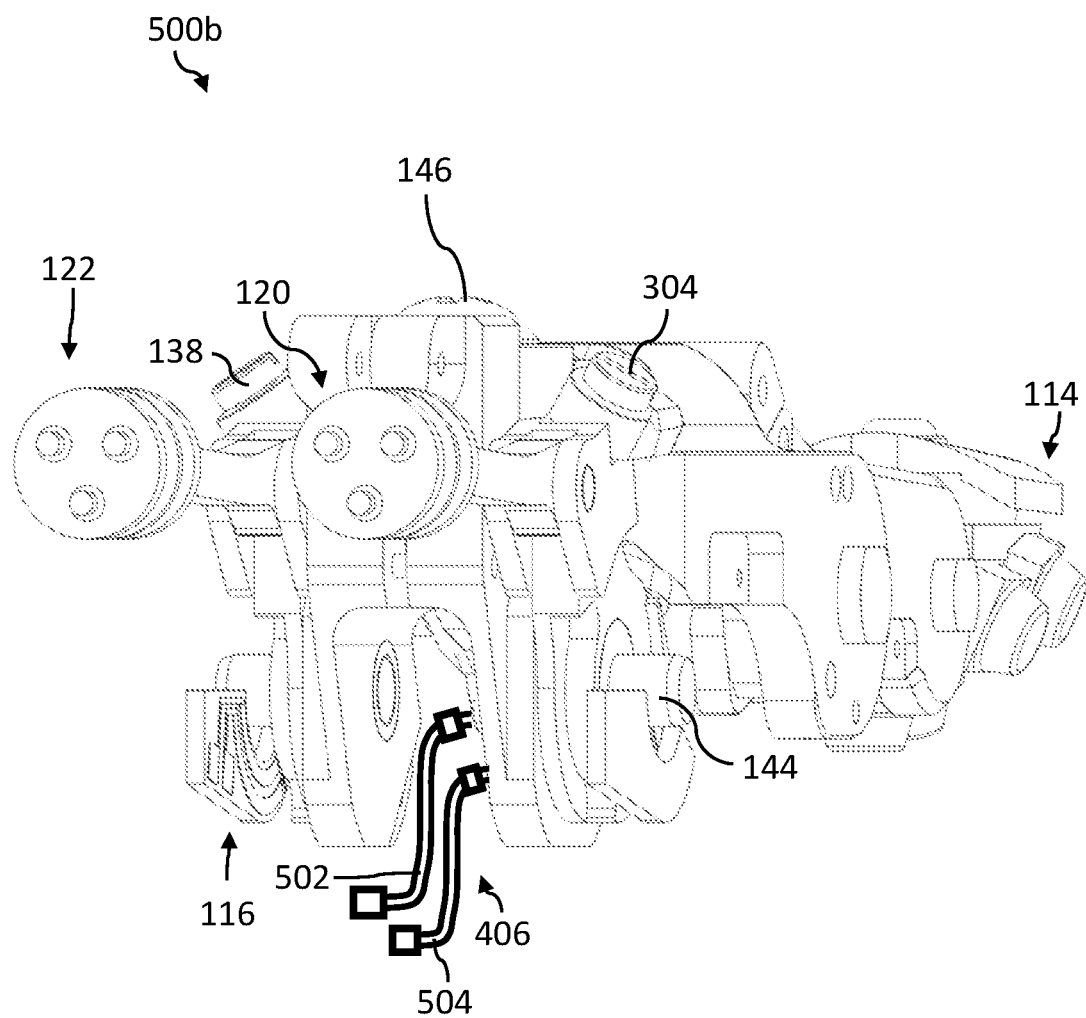
FIG. 5B is a schematic drawing of another portion of the robotic digit of FIG. 1A shown in an oblique view from the metacarpal side of the MCP joint, in accordance with the present systems, devices, and methods.

FIG. 5B is a schematic drawing of a portion 500b of robotic digit 100a of FIG. 1A shown in an oblique view from the metacarpal side of the MCP joint, in accordance with the present systems, devices, and methods. Portion 500b is the same as or similar to portion 500a of FIG. 5A with the addition of a hydraulic hose 502 and an electrical wire 504. The same reference numbers have been used for elements of portion 500b that are the same as or similar to elements of digit 100a of FIG. 1A, as shown and described with respect to FIGS. 1A, 1B, 1C, 3, 4A, 4B, and 5A, including passage 406 through which hydraulic hose 502 and electrical wire 504 pass.

Figures 6A, 6B, 6C:
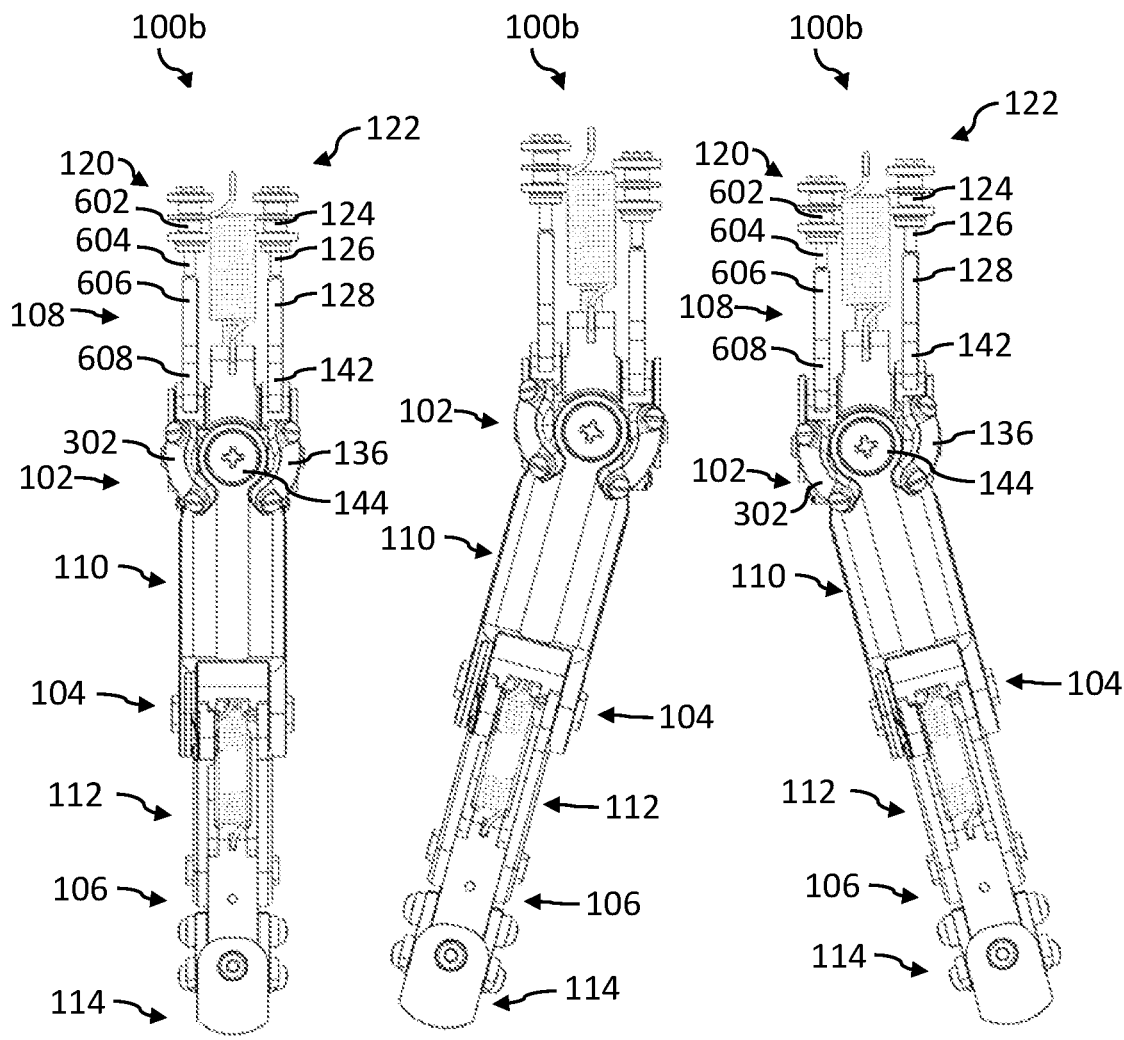
FIGS. 6A, 6B, and 6C are schematic drawings of the portion of FIG. 1B of the robotic digit of FIG. 1A in various positions of abduction and adduction, in accordance with the present systems, devices, and methods.

FIGS. 6A, 6B, and 6C are schematic drawings of portion 100b of FIG. 1B of robotic digit 100a of FIG. 1A in various positions of abduction and adduction, in accordance with the present systems, devices, and methods. FIG. 6A shows portion 100b with proximal phalange 110 in a baseline relative configuration with respect to metacarpal 108. The baseline relative configuration of proximal phalange 110 with respect to metacarpal 108 has at least approximately zero flexion, at least approximately zero extension, at least approximately zero abduction and at least approximately zero adduction. In the present application, the phrase "at least approximately zero" with respect to an angle of abduction, adduction, flexion, and/or extension means an angle within plus or minus one degree. FIG. 6B shows portion 100b at an angle of +15° abduction. FIG. 6C shows portion 100b at an angle of −15° abduction.

Figure 6D:
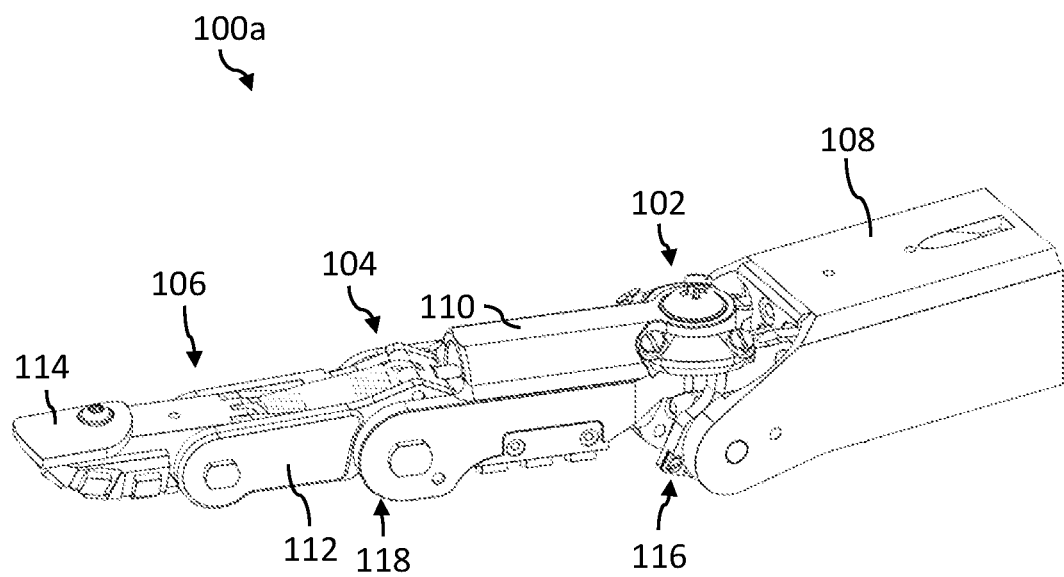
FIG. 6D is a schematic drawing of the robotic digit of FIG. 1A at an angle of +15° abduction, in accordance with the present systems, devices, and methods.

FIG. 6D is a schematic drawing of robotic digit 100a of FIG. 1A at an angle of +15° abduction, in accordance with the present systems, devices, and methods.

The same reference numbers have been used for elements of portion 100b in FIGS. 6A, 6B, 6C, and 6D that are the same as or similar to elements of digit 100a of FIG. 1A, as shown and described with respect to FIGS. 1A, 1B, 1C, 3, 4A, 4B, 5A, and 5B. Elements of hydraulic actuator 120 are labeled in FIGS. 6A and 6C. For clarity, the labels are not shown in FIG. 6B. Hydraulic actuator 120 includes a hydraulic cylinder 602 and a hydraulic piston 604. A coupling arm 606 provides a mechanical coupling of hydraulic piston 604 to input ring 608.

In FIG. 6A, hydraulic actuators 120 and 122 are in the same position as each other, and there is no abduction or adduction at MCP joint 102 of proximal phalange 110 with respect to metacarpal 108.

FIG. 6B shows the positions of hydraulic actuators 120 and 122 after hydraulic piston 126 has moved relative to its position in FIG. 6A in a distal direction in hydraulic cylinder 124 along its longitudinal axis (axis 310 of FIG. 3). The movement of hydraulic piston 126 causes a rotation of input ring 142 about axle 144 by a mechanical coupling through coupling arm 128. Rotation of input ring 142 causes a movement of spherical linkage 136 about its center which, in turn, causes a rotation of proximal phalange 110 about hinge 146. The differential linear movement of hydraulic piston 126 of hydraulic actuator 122 and hydraulic piston 604 of hydraulic actuator 120 causes a net positive rotation of proximal phalange 110 about hinge 146. In the example illustrated in FIG. 6B, the rotation of proximal phalange 110 about hinge 146 produces an abduction angle of +15°.

FIG. 6C shows the positions of hydraulic actuators 120 and 122 after hydraulic piston 604 has moved relative to its position in FIG. 6A in a distal direction in hydraulic cylinder 602 along its longitudinal axis (axis 312 of FIG. 3). The movement of hydraulic piston 604 causes a rotation of input ring 608 about axle 144 by a mechanical coupling through coupling arm 606. Rotation of input ring 608 causes a movement of spherical linkage 302 about its center which, in turn, causes a rotation of proximal phalange 110 about hinge 146. The differential linear movement of hydraulic piston 604 of hydraulic actuator 120 and hydraulic piston 126 of hydraulic actuator 122 causes a net negative rotation of proximal phalange 110 about hinge 146. In the example illustrated in FIG. 6C, the rotation of proximal phalange 110 about hinge 146 produces an abduction angle of −15°.

Figure 7A:
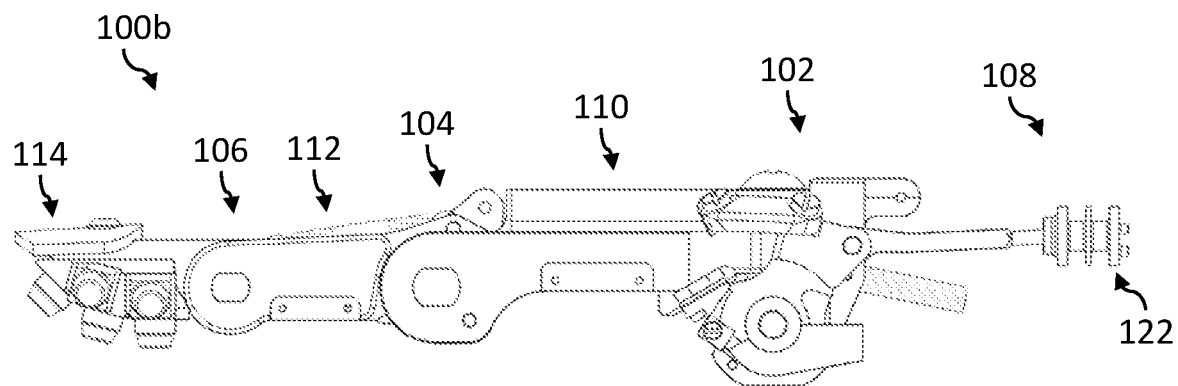
FIGS. 7A and 7B are schematic drawings of the portion of FIG. 1B of the robotic digit of FIG. 1A in various positions of flexion and extension, in accordance with the present systems, devices, and methods.
Figure 7B:
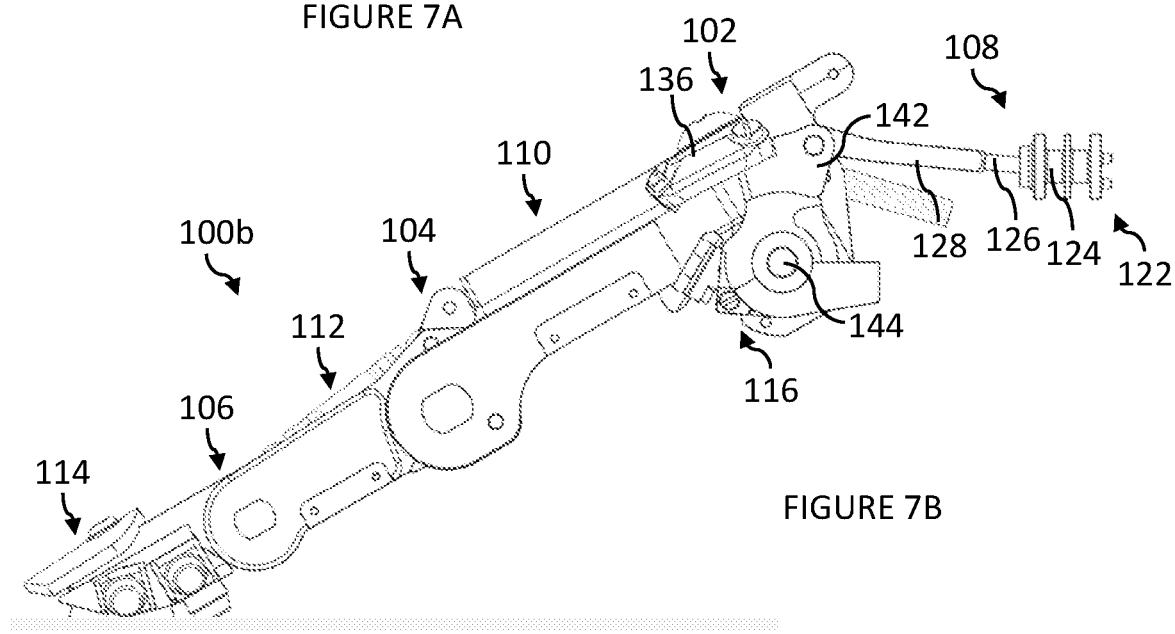

FIGS. 7A and 7B are schematic drawings of portion 100b of FIG. 1B of robotic digit 100a of FIG. 1A in various positions of flexion and extension, in accordance with the present systems, devices, and methods. FIG. 7A shows portion 100b in a configuration having at least approximately zero flexion and at least approximately zero abduction. FIG. 7B shows portion 100b in a configuration having at an angle of +30° flexion.

In FIG. 7A, hydraulic actuators 120 and 122 are in the same baseline position as each other, and there is no flexion or extension at MCP joint 102 of proximal phalange 110 with respect to metacarpal 108. Hydraulic actuator 120 is directly behind hydraulic actuator 122 in FIG. 7A, and is therefore not visible in FIG. 7A and not labeled. Hydraulic actuator 120 is described above with reference to FIG. 1B.

FIG. 7B shows the positions of hydraulic actuators 120 and 122 after hydraulic pistons 604 and 126 of hydraulic actuators 120 and 122, respectively, have moved the same distance in a distal direction in hydraulic cylinders 602 and 124, respectively, along their respective longitudinal axis (axes 312 and 310 of FIG. 3). The movement of hydraulic pistons 604 and 126 causes a rotation of input rings 608 and 142, respectively, about axle 144 by a mechanical coupling through coupling arms 606 and 128, respectively. Rotation of input rings 608 and 142 causes a movement of spherical linkages 302 and 136, respectively, about their shared center which, in turn, causes a rotation of proximal phalange 110 about axle 144 (along axis 314 of FIG. 3). The common linear movement of hydraulic pistons 604 and 126 of hydraulic actuators 120 and 122, respectively, causes a net positive rotation of proximal phalange 110 about axle 144. In the example illustrated in FIG. 6C, the rotation of proximal phalange 110 about axle 144 produces a flexion angle of +30°.

Figure 7C:
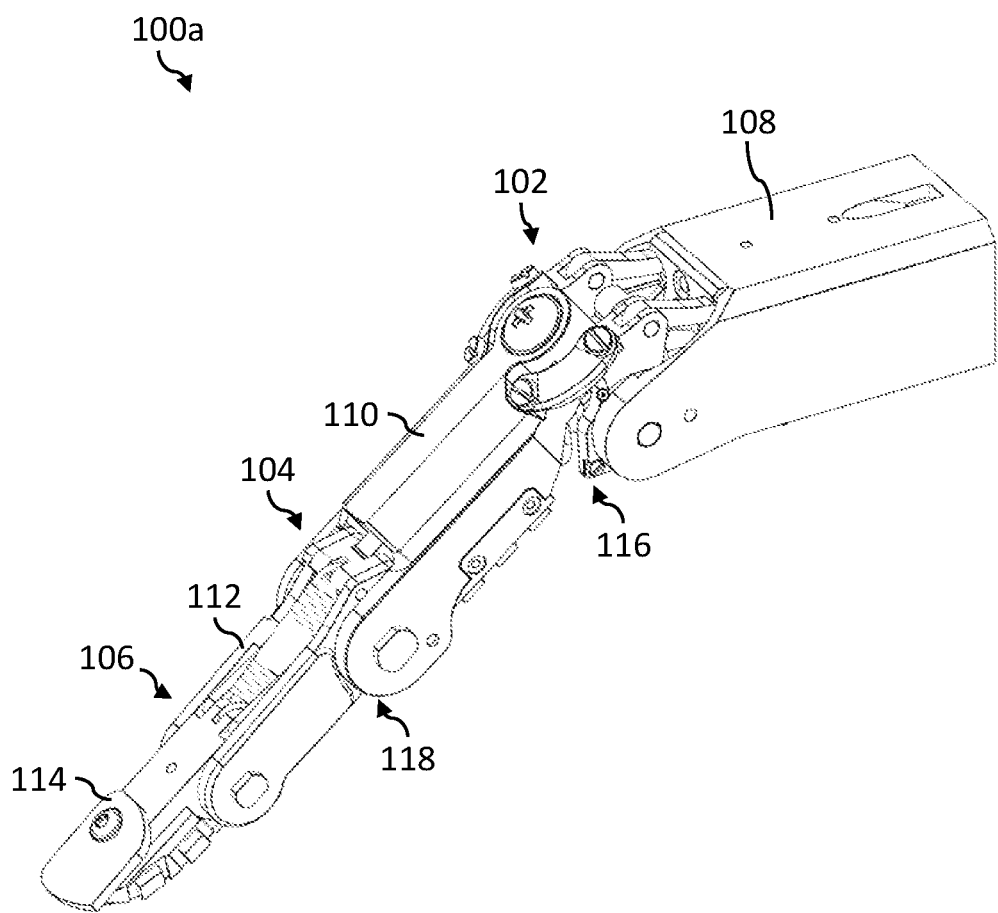
FIGS. 7C and 7D are schematic drawings of the robotic digit of FIG. 1A in various positions of flexion and extension, in accordance with the present systems, devices, and methods.
Figure 7D:
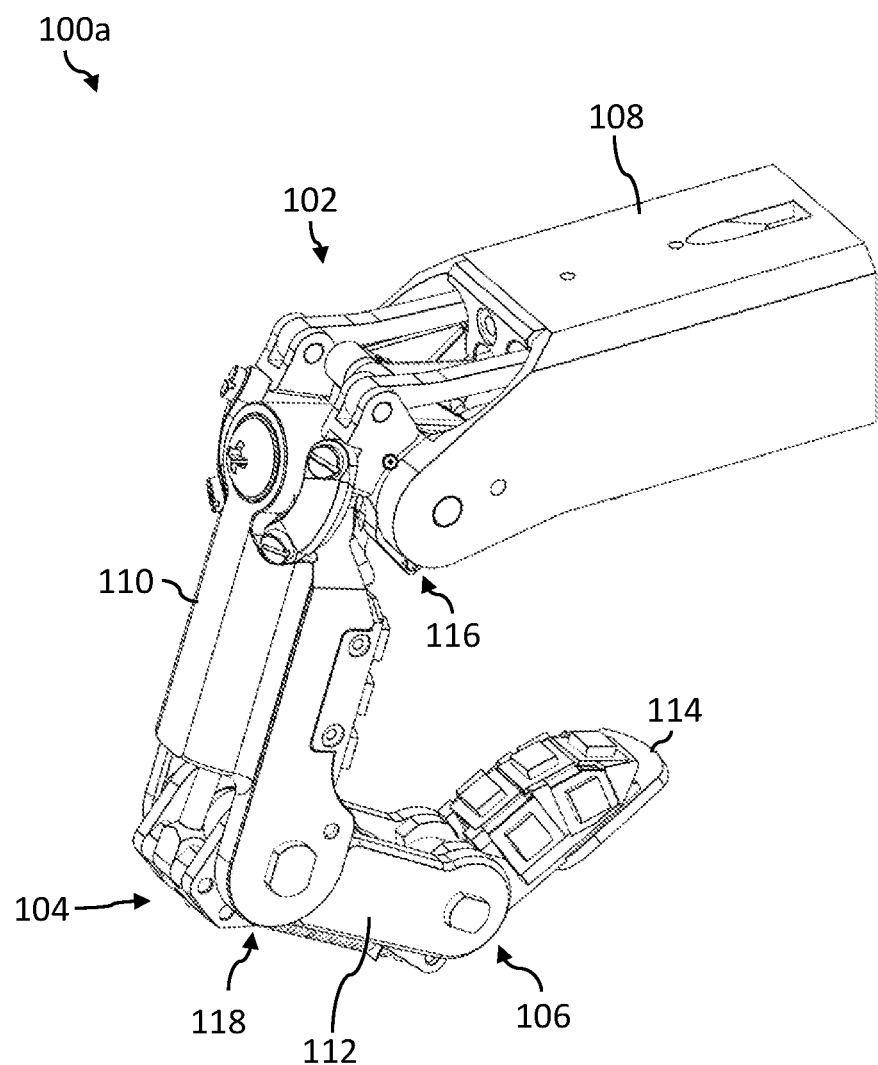

FIGS. 7C and 7D are schematic drawings of robotic digit 100a of FIG. 1A in various positions of flexion and extension, in accordance with the present systems, devices, and methods. FIG. 7C shows robotic digit 100a at an angle of +30° flexion at MCP joint 102. FIG. 7D shows robotic digit 100a with angles of greater than +60° flexion at each of MCP joint 102, PIP joint 104, and DIP joint 106.

In some implementations (though not shown in FIGS. 7A through 7D), robotic digit 100a, or portion 100b thereof, has a negative flexion angle.

While FIGS. 6A through 6D, and 7A through 7D, respectively, show abduction/adduction and flexion/extension movements separately, the technology described herein can use hydraulic actuators 120 and 122 to control independent abduction/adduction and flexion/extension movements at the same time. As explained above, a common movement of a respective hydraulic piston of each hydraulic actuator can control a flexion/extension movement of the digit. A differential movement of a respective hydraulic piston of each hydraulic actuator can control an abduction/adduction movement of the digit.

Figure 8:
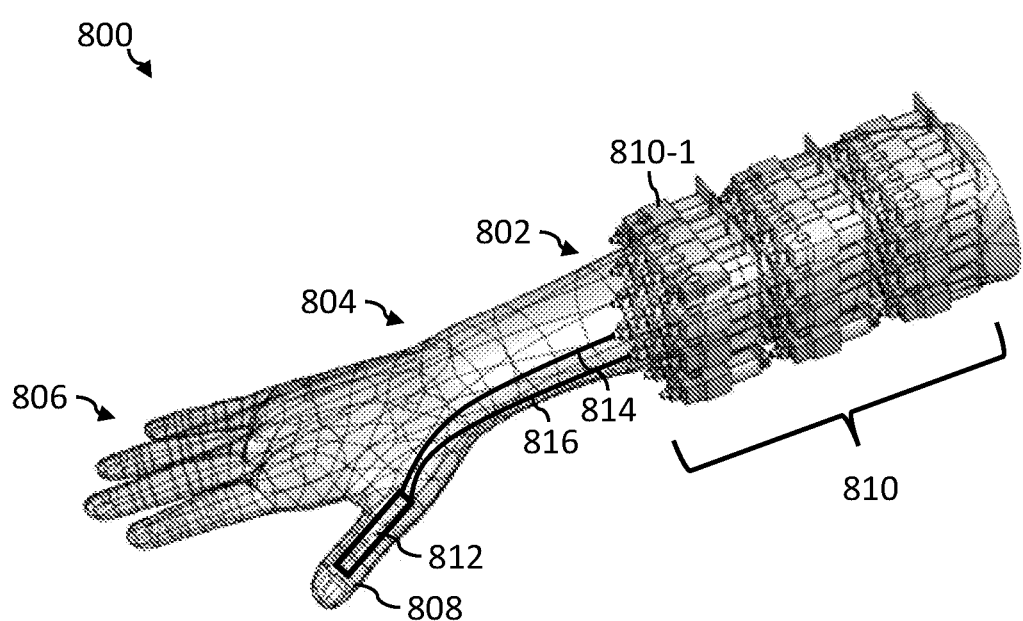
FIG. 8 is a schematic drawing of an example implementation of a portion of a hydraulic system in a forearm, wrist, and hand of a robot, in accordance with the present systems, devices, and methods.

In some implementations, the present systems, devices, and methods may be combined with a miniaturized hydraulic system integrated into the forearm of a humanoid robot as described in U.S. Provisional Patent Application Ser. No. 63/191,732, filed May 21, 2021 and entitled "SYSTEMS, DEVICES, AND METHODS FOR A HYDRAULIC ROBOTIC ARM", which is incorporated by reference herein in its entirety. FIG. 8 is a schematic drawing of an example implementation of a portion 800 of a hydraulic system in a forearm 802, wrist 804, and hand 806 of a robot (e.g., robot 900 of FIG. 9), in accordance with the present systems, devices, and methods. Hand 806 includes a robotic digit 808.

Forearm 802 includes a set of valves 810 which is integrated with forearm 802. Valves 810 include valve 810-1. (Only one valve is separately labeled for clarity of illustration.) Valves 810 may include pressure valves and exhaust valves. Valves 810 may include electrohydraulic servo valves, and may be operated by a controller (not shown in FIG. 8).

Digit 808 includes an actuation piston 812 integrated with digit 808. Actuation piston 812 is hydraulically coupled to valves 810 via a pressure hose 814 and an exhaust hose 816.

In some implementations, digit 808 may include multiple actuators. Some actuators may be used to control movement of joints in digit 808. For example, actuators may be used to control movement of one or more knuckle joints.

Digit 808 may include one or more knuckle joints. For example, digit 808 may include one or more of a metacarpophalangeal (MCP) joint, a proximal interphalangeal (PIP) joint, and a distal interphalangeal (DIP) joint. Digit 808 may include a spherical differential joint (e.g., a spherical differential MCP joint) as described above (for example, the joint of portion 100c of FIG. 1C). The spherical differential joint of digit 808 may be hydraulically-actuated.

Digit 808 may include one or more position transducers operable to provide absolute and/or relative positional data for one or more components of digit 808. The positional data may be used to control digit 808.

Figure 9:
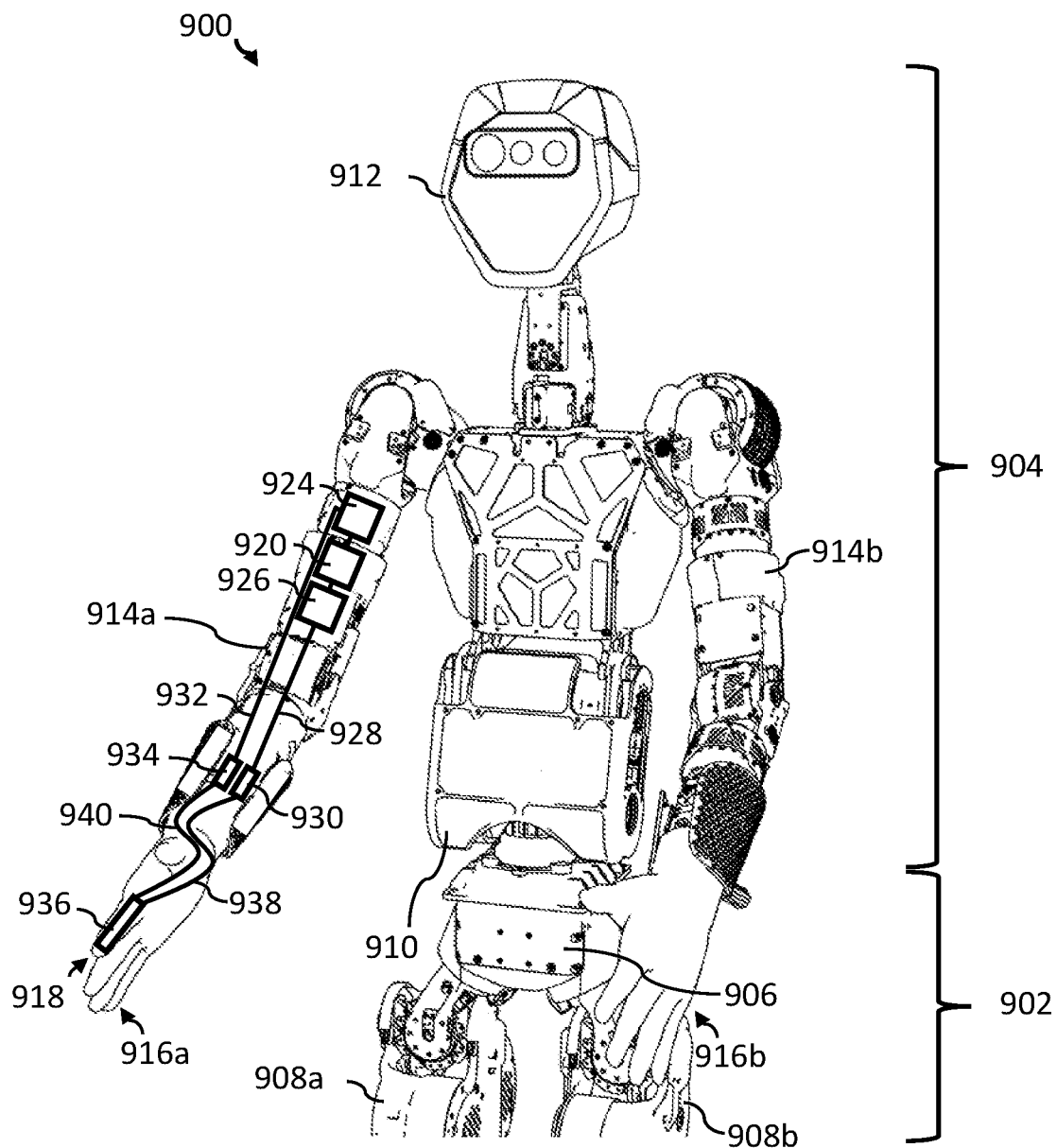
FIG. 9 is a schematic drawing of an example implementation of a hydraulically-powered robot, in accordance with the present systems, devices, and methods.

FIG. 9 is a schematic drawing of an example implementation of a robot 900, in accordance with the present systems, devices, and methods. Robot 900 comprises a base 902 and a humanoid upper body 904. Base 902 comprises a pelvic region 906 and two legs 908a and 908b (collectively referred to as legs 908). Only the upper portion of legs 908 is shown in FIG. 9. In other example implementations, base 902 may comprise a stand and (optionally) one or more wheels.

Upper body 904 comprises a torso 910, a head 912, right-side arm 914a and a left-side arm 914b (collectively referred to as arms 914), and a right hand 916a and a left hand 916b (collectively referred to as hands 916). Arms 914 of robot 900 are also referred to in the present application as robotic arms. Arms 914 of robot 900 are humanoid arms. In other implementations, arms 914 have a form factor that is different from a form factor of a humanoid arm.

Hands 916 are also referred to in the present application as end effectors. In other implementations, hands 916 have a form factor that is different from a form factor of a humanoid hand. Each of hands 916 comprises one or more digits, for example, digit 918 of hand 916a. Digits may include fingers, thumbs, or similar structures of the hand or end effector.

Robot 900 is a hydraulically-powered robot. In other implementations, robot 900 has alternative or additional power systems. In some implementations, base 902 and/or torso 910 of upper body 904 house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of robot 900 comprises a hydraulic pump 922, a reservoir 924, and an accumulator 926, housed in arm 914a. Hose 928 provides a hydraulic coupling between accumulator 926 and a pressure valve 930 of the hydraulic control system. Hose 932 provides a hydraulic coupling between an exhaust valve 934 of the hydraulic control system and reservoir 924.

Pressure valve 930 is hydraulically coupled to an actuation piston 936 by a hose 938. Actuation piston 936 is hydraulically coupled to exhaust valve 934 by a hose 940. Hoses 928 and 938, and pressure valve 930, provide a forward path to actuation piston 936. Hoses 932 and 940, and exhaust valve 934 provide a return path to actuation piston 936. Pressure valve 930 and exhaust valve 934 can control actuation piston 936, and can cause actuation piston 936 to move, which can cause a corresponding motion of at least a portion of hand 916a, for example, digit 918.

Each of hands 916 may have more than one degree of freedom (DOF). In some implementations, each hand has up to eighteen (18) DOFs. Each DOF can be driven by a respective actuation piston (for example, actuation piston 936). For clarity of illustration, only one actuation piston is shown in FIG. 9. Each actuation piston may be located in hands 916.

In some implementations, digit 918 may include multiple actuators. Some actuators may be used to control movement of joints in digit 918. For example, actuators may be used to control movement of one or more knuckle joints.

Digit 918 may include one or more knuckle joints. For example, digit 918 may include one or more of a metacarpophalangeal (MCP) joint, a proximal interphalangeal (PIP) joint, and a distal interphalangeal (DIP) joint. Digit 918 may include a spherical differential joint (e.g., a spherical differential MCP joint) as described above (for example, the joint of portion 100c of FIG. 1C). The spherical differential joint of digit 918 may be hydraulically-actuated.

Digit 918 may include one or more position transducers operable to provide positional data for robot 900 to be self-aware of a position of one or more components of digit 918 with respect to each other, and/or to provide control of digit 918.

The various implementations described herein may include, or be combined with, any or all of the systems, devices, and methods described in U.S. patent application Ser. No. 17/491,577 and/or U.S. patent application Ser. No. 18/126,343, both of which are incorporated herein by reference in their entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robotic joint comprising:
a first portion comprising a first actuator and a second actuator;
a first spherical linkage having a first end mechanically coupled to the first actuator and a second end mechanically coupled to a second portion of the robotic joint, the first spherical linkage comprising a first segment of a spherical shell; and
a second spherical linkage having a third end mechanically coupled to the second actuator and a fourth end mechanically coupled to the second portion, the second spherical linkage comprising a second segment of the spherical shell, wherein the first spherical linkage and the second spherical linkage are positioned about a center of the spherical shell, and wherein the first actuator and the second actuator are operable in combination to control movement of the second portion relative to the first portion with two degrees of freedom, wherein a first degree of freedom of the two degrees of freedom includes at least one of a flexion or an extension and a second degree of freedom of the two degrees of freedom includes at least one of an abduction or an adduction, and wherein the first actuator and the second actuator each cause a first respective movement in the same direction as each other to control the at least one of a flexion or an extension and the first actuator and the second actuator each cause a second respective movement in opposite directions to each other to control the at least one of an abduction or an adduction.

2. The robotic joint of claim 1, wherein the first actuator is a first hydraulic actuator and the second actuator is a second hydraulic actuator.

3. The robotic joint of claim 2, wherein the first hydraulic actuator includes a first hydraulic cylinder and a first hydraulic piston, the first hydraulic piston movable along a first longitudinal axis of the first hydraulic cylinder, and the second hydraulic actuator includes a second hydraulic cylinder and a second hydraulic piston, the second hydraulic piston movable along a second longitudinal axis of the second hydraulic cylinder, the first longitudinal axis parallel to the second longitudinal axis.

4. The robotic joint of claim 3, wherein the movement of the second portion relative to the first portion in a first degree of freedom of the two degrees of freedom includes a rotation about a first axis of rotation, the first axis of rotation perpendicular to the first longitudinal axis and lying in a plane that includes the first longitudinal axis and the second longitudinal axis.

5. The robotic joint of claim 4, wherein the movement of the second portion relative to the first portion of the robotic joint in a second degree of freedom of the two degrees of freedom includes a rotation about a second axis of rotation, the second axis of rotation perpendicular to the first longitudinal axis and perpendicular to the plane that includes the first longitudinal axis and the second longitudinal axis.

6. The robotic joint of claim 3, wherein the movement of the second portion relative to the first portion in a degree of freedom of the two degrees of freedom includes a rotation about an axis of rotation, the axis of rotation perpendicular to the first longitudinal axis and perpendicular to a plane that includes the first longitudinal axis and the second longitudinal axis.

7. The robotic joint of claim 1, wherein at least one of the first actuator and the second actuator is a double-acting actuator.

8. The robotic joint of claim 1, the first portion comprising:
a first input ring, the first end of the first spherical linkage mechanically coupled to the first actuator via the first input ring;
a second input ring, the third end of the second spherical linkage mechanically coupled to the second actuator via the second input ring, the plane of the second input ring parallel to the plane of the first input ring; and
a first axle oriented along a first axis perpendicular to the plane of the first input ring and the plane of the second input ring, wherein the movement of the second portion relative to the first portion includes a rotation about the first axis, the rotation causing at least one of a flexion or an extension.

9. The robotic joint of claim 8, further comprising a hinge, the hinge comprising a second axle oriented along a second axis perpendicular to a plane that passes through a first longitudinal axis of the first actuator and a second longitudinal axis of the second actuator, wherein the movement of the second portion relative to the first portion includes a rotation about the second axis, the rotation causing at least one of an abduction or an adduction.

10. The robotic joint of claim 1, further comprising a hinge, the hinge comprising an axle oriented along an axis perpendicular to a plane that passes through a first longitudinal axis of the first actuator and a second longitudinal axis of the second actuator, wherein the movement of the second portion relative to the first portion includes a rotation about the axis, the rotation causing at least one of an abduction or an adduction.

11. The robotic joint of claim 1, the first portion further comprising a spring wherein the spring is operable to return the second portion to a baseline relative configuration of the first portion and the second portion.

12. The robotic joint of claim 1, further comprising a passage to accommodate at least one of an electrical wire or a hydraulic hose that passes from the first portion to the second portion.

13. The robotic joint of claim 1, further comprising a passage, and at least one of an electrical wire or a hydraulic hose that passes from the first portion to the second portion via the passage.

14. The robotic joint of claim 1, wherein the robotic joint is a metacarpophalangeal (MCP) joint of a humanoid robot.

* * * * *